United States Patent
Holenarsipur

(10) Patent No.: US 9,098,124 B2
(45) Date of Patent: Aug. 4, 2015

(54) PROXIMITY SENSORS WITH SMUDGE DETECTION CAPABILITIES

(71) Applicant: Apple Inc., Cupertino, CA (US)

(72) Inventor: Prashanth S. S. Holenarsipur, Fremont, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 13/738,769

(22) Filed: Jan. 10, 2013

(65) Prior Publication Data

US 2014/0191110 A1   Jul. 10, 2014

(51) Int. Cl.
*H01J 40/14* (2006.01)
*G06F 3/03* (2006.01)

(52) U.S. Cl.
CPC .......................................... *G06F 3/03* (2013.01)

(58) Field of Classification Search
CPC .............. G01J 1/04; G01J 1/42; G02F 1/1333
USPC ............ 250/221, 559.4, 227.22, 556, 559.44; 345/173–178, 102–104; 385/8–14, 385/145–156
See application file for complete search history.

(56) References Cited

U.S. PATENT DOCUMENTS

| | | | |
|---|---|---|---|
| 5,483,346 A | 1/1996 | Butzer | |
| 6,835,923 B2 | 12/2004 | Hamalainen et al. | |
| 8,847,924 B2 * | 9/2014 | Blythe et al. | 345/176 |
| 2009/0128499 A1 | 5/2009 | Izadi et al. | |
| 2010/0302185 A1 | 12/2010 | Han et al. | |
| 2012/0127128 A1 | 5/2012 | Large et al. | |

* cited by examiner

*Primary Examiner* — Que T Le
(74) *Attorney, Agent, or Firm* — Treyz Law Group; Jason Tsai

(57) ABSTRACT

An electronic device may be provided with a touch screen display that is controlled based on information from a proximity sensor attached underneath a display layer. The proximity sensor may have a light source that emits infrared light and a light detector that detects reflected infrared light. When the electronic device is in the vicinity of a user's head, the proximity sensor may produce data indicative of the presence of the user's head. Variations in proximity sensor output due to smudges on the proximity sensor can be detected by providing the proximity sensor with an additional light source. The additional light source may be used to inject light into the display layer. The injected light may be guided within the display layer by total internal reflection. In the presence of smudge, the internally reflecting light may deviate from its normal propagation path.

24 Claims, 10 Drawing Sheets

PROXIMITY SENSORS WITH SMUDGE DETECTION CAPABILITIES

BACKGROUND

This relates generally to electronic devices and, more particularly, to electronic devices with proximity sensors.

Cellular telephones are sometimes provided with proximity sensors. For example, a cellular telephone may be provided with a proximity sensor that is located near an ear speaker on a front face of the cellular telephone.

The front face of the cellular telephone may also contain a touch screen display. The proximity sensor may be used to determine when the cellular telephone is near the head of a user. When not in proximity to the head of the user, the cellular telephone may be placed in a normal mode of operation in which the touch screen display is used to present visual information to the user and in which the touch sensor portion of the touch screen is enabled. In response to determining that the cellular telephone has been brought into the vicinity of the user's head, the display may be disabled to conserve power and the touch sensor on the display may be temporarily disabled to avoid inadvertent touch input from contact between the user's head and the touch sensor.

A proximity sensor for use in a cellular telephone may be based on an infrared light-emitting diode and a corresponding infrared light detector. During operation, the light-emitting diode may emit infrared light outwards from the front face of the cellular telephone. When the cellular telephone is not in the vicinity of a user's head, the infrared light will not be reflected towards the light detector and only small amounts of reflected light will be detected by the light, detector. When, however, the cellular telephone is adjacent to the user's head, the emitted light from the infrared light-emitting diode will be reflected from the user's head and detected by the light detector.

Light-based proximity sensors such as these may be used to detect the position of a cellular telephone relative to a user's head, but can be challenging to operate accurately. If care is not taken, it can be difficult to determine when a user's head is in the vicinity of the cellular telephone, particularly when the proximity sensor has become smudged with grease from the skin of the user.

It would therefore be desirable to be able to provide improved ways in which to use proximity sensors to accurately determine whether a user's head is in the vicinity of cellular telephone or other electronic device.

SUMMARY

An electronic device may be provided with electronic components such as a touch screen display. The touch screen display may be controlled based on information from a proximity sensor. For example, when the proximity sensor indicates that the electronic device is not near the head of a user, the electronic device may be operated in a normal mode in which the display is used to display images and in which the touch sensor functionality of the display is enabled. When the proximity sensor indicates that the electronic device is in the vicinity of the user's head, the electronic device may be operated in a close proximity mode in which display pixels in the display are disabled, and in which the touch sensor functionality of the display is disabled.

The proximity sensor may be mounted under a display layer of the electronic device. The proximity sensor may include a first light source (e.g., an infrared light-emitting diode) that is configured to emit a first light signal and a light detector (e.g., a photodiode) configured to receive reflections of the first light signal. The electronic device may include a second light source (e.g., a laser-based light-emitting diode) configured to emit a second light signal that is guided within the display layer by total internal reflection. The second light signal may also be received by the light detector in the proximity sensor.

The first light signal may exhibit a first frequency, whereas the second light signal may exhibit a second frequency that is different than the first frequency. The proximity sensor may gather proximity sensor data at the first, frequency and smudge sensing data at the second frequency to generate a corresponding sensor output signal. The proximity sensor may be provided with associated signal processing circuitry that receives the sensor output signal and that performs selective filtering on the sensor output signal.

In one suitable arrangement, the signal processing circuitry may filter the sensor output signal by applying band-pass filtering at the first frequency to isolate the proximity sensor data during a first, time period and may filter the sensor output signal by applying band-pass filtering at the second, frequency to isolate the smudge sensing data during a second time period. In another suitable arrangement, the signal processing circuitry may convert the output signal to digital bits and perform fast Fourier transform (FFT) operations on the digital bits the separate the proximity sensor data from the smudge sensing data.

Measurements gathered on the second light signal may be used to determine whether smudges are present on the display layer. Measurements gathered on the first light signal, while taking into account whether smudges are present, may be used to determine whether or not an external object is in close proximity to the electronic device.

Further features of the present invention, its nature and various advantages will be more apparent from the accompanying drawings and the following detailed description.

DETAILED DESCRIPTION

An electronic device may be provided with electronic components such as touch screen displays. The functionality of the electronic device may be controlled based on how far the electronic device is located from external objects such as a user's head. When the electronic device is not in the vicinity of the user's head, for example, the electronic device can be operated in a normal mode in which the touch screen display is enabled. In response to detection of the presence if the user's head in the vicinity of the electronic device, the electronic device may be operated, in a mode in which the touch screen is disabled or other appropriate actions are taken. Disabling touch sensing capabilities from the electronic device when the electronic device is near the user's head may help avoid inadvertent touch input as the touch sensor comes into contact with the user's ear and hair. Disabling display functions in the touch screen display when the electronic device is near the user's head may also help conserve power and reduce user confusion about the status of the display.

An electronic device may use one or more proximity sensors to detect external objects. As an example, an electronic device may use an infrared-light-based proximity sensor to gather proximity data. During operation, proximity data from the proximity sensor may be compared to one or more threshold values. Based on this proximity sensor data analysis, the electronic device can determine whether or not the electronic device is near the user's head and can take appropriate action. A proximity sensor may detect the presence of external objects via optical sensing mechanisms, electrical sensing mechanism, and/or other types of sensing techniques.

Figure 1:
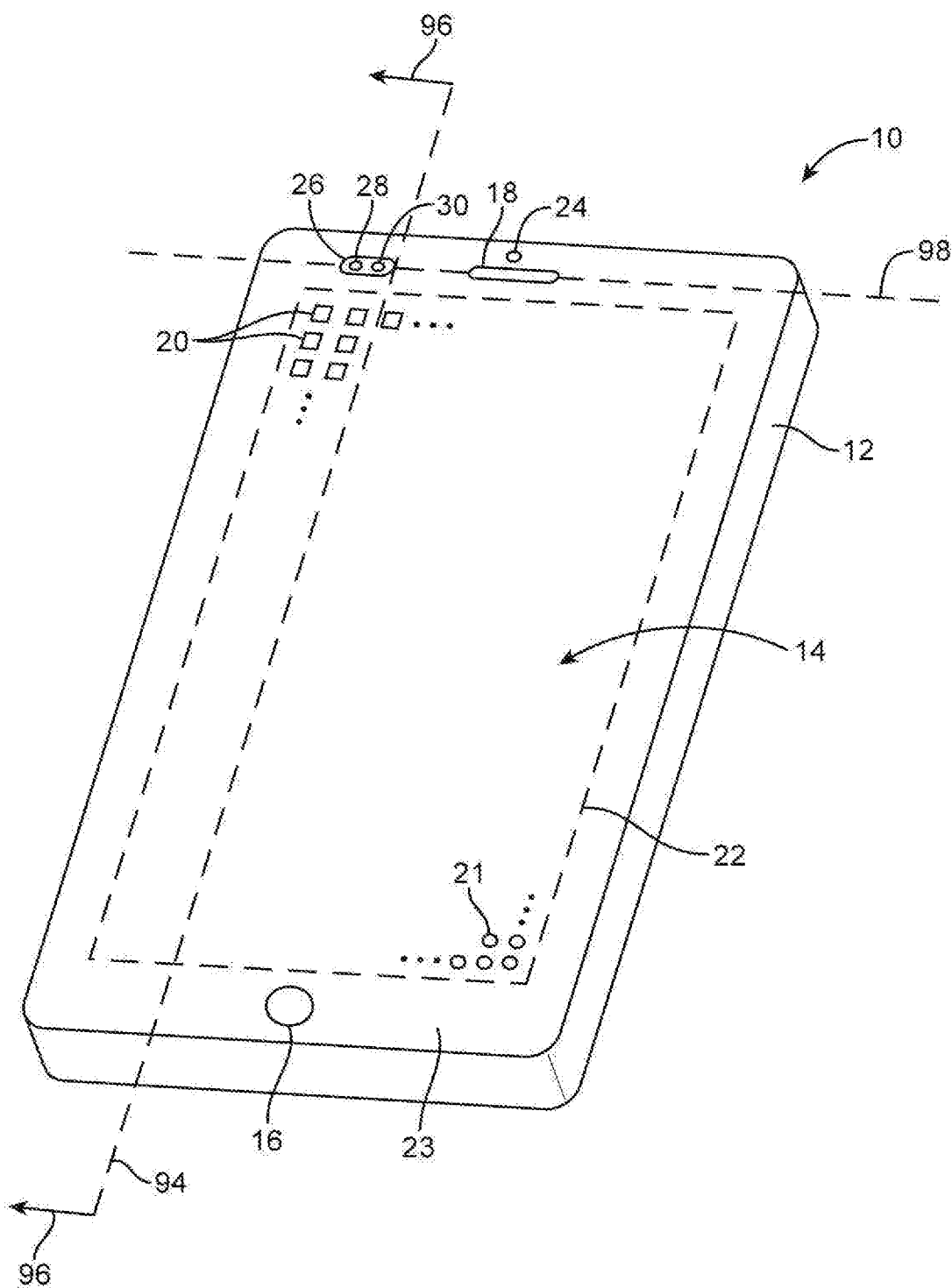
FIG. 1 is a perspective view of an illustrative electronic device with a proximity sensor in accordance with embodiments of the present invention.

An illustrative electronic device that may be provided with a proximity sensor is shown in FIG. 1. Electronic devices such as device 10 of FIG. 1 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, or other electronic equipment.

As shown in the example of FIG. 1, device 10 may include a display such as display 14. Display 14 may be mounted in a housing such as housing 12. Housing 12 may have upper and lower portions joined by a hinge (e.g., in a laptop computer) or may form a structure without a hinge, as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded, as a single structure or may be formed using multiple structures (e.g., an internal frame structure, one or more structures that form exterior housing surfaces, etc.).

Display 14 may be a touch screen display that incorporates a layer of conductive capacitive touch, sensor electrodes such as electrodes 20 or other touch sensor components (e.g., resistive touch sensor components, acoustic touch sensor components, force-based touch sensor components, light-based touch sensor components, etc.) or may be a display that is not touch-sensitive. Capacitive touch screen electrodes 20 may be formed from an array of indium tin oxide pads or other transparent conductive structures.

Display 14 may include an array of display pixels such as pixels 21 formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels (e.g., to increase or decrease the brightness of the image produced by display pixels 21) and thereby adjust, display brightness. Display 14 may also include organic light-emitting diode pixels or other pixels with adjustable intensities. In this type of display, display brightness can be adjusted by adjusting the intensities of drive signals used, to control individual display pixels.

Display 14 may be protected using a display cover layer such as a layer of transparent glass or clear plastic, in arrangements in which the display cover layer is formed from glass, the display cover layer may be referred to as display cover glass (CG). Openings may be formed in the display cover layer. For example, an opening may be formed in the display cover layer to accommodate a button such as button 16. An opening may also be formed in the display cover layer to accommodate ports such as speaker port 18.

In the center of display 14 (e.g., in the portion of display 14 within rectangular region 22 of FIG. 1), display 14 may contain an array of active display pixels such as pixels 21. Region 22 may therefore sometimes be referred to as the active region of display 14. The rectangular ring-shaped region 23 that surrounds the periphery of active display region 22 may not contain any active display pixels and may therefore sometimes be referred to as the inactive region of display 14. The display cover layer or other display layers in display 14 may be provided with an opaque masking layer in the inactive region to hide internal components from view by a user. Openings may be formed in the opaque masking layer to accommodate light-based components. For example, an opening may be provided in the opaque masking layer to accommodate an ambient light sensor such as ambient light sensor 24.

If desired, an opening in the opaque masking layer may be filled with an ink or other material that is transparent to infrared, light but opaque to visible light. As an example, light-based proximity sensor 26 may be mounted under this type of opening in the opaque masking layer of the inactive portion of display 14. Light-based proximity sensor 26 may include a light transmitter such as light source 28 and a light sensor such as light detector 30. Light source 28 may be an infrared, light-emitting diode and light detector 30 may be a photodetector based on a transistor or photodiode (as examples). During operation, proximity sensor detector 30 may gather light from source 28 that has reflected from nearby objects. Other types of proximity sensor may be used in device 10 if desired. The use of a proximity sensor that includes infrared light transmitters and sensors is merely illustrative.

Proximity sensor 26 may detect when a user's head, a user's fingers, or other external object is in the vicinity of device 10 (e.g., within 5 cm or less of sensor 26, within 1 cm or less of sensor 26, or within other suitable distance of sensor 26).

During operation of device 10, proximity sensor data from proximity sensor 26 may be used in controlling the operation of device 10. For example, when proximity sensor measurements from sensor 26 indicate that device 10 is in the vicinity of the user's head (and that the user's head, is in the vicinity of device 10), device 10 can be placed in a close proximity mode. When operating in the close proximity mode, the functionality of device 10 can be altered to ensure proper operation of device 10. For example, touch screen input can be temporarily disabled so that touch events related to contact between the user's head and one or more of capacitive touch sensor electrodes 20 can be ignored. Display brightness can also be turned down partly or fully by disabling a backlight, in device 10 or by otherwise temporarily disabling display pixels 21, thereby conserving power. In the event that proximity sensor data indicates that device 10 and the user's head are not adjacent to each other, (e.g., when it is determined that device 10 is more than 1 cm from the user's head, is more than 5 cm from the user's head, etc.), device 10 can be placed in a normal (non-close-proximity) operating mode.

Figure 2:
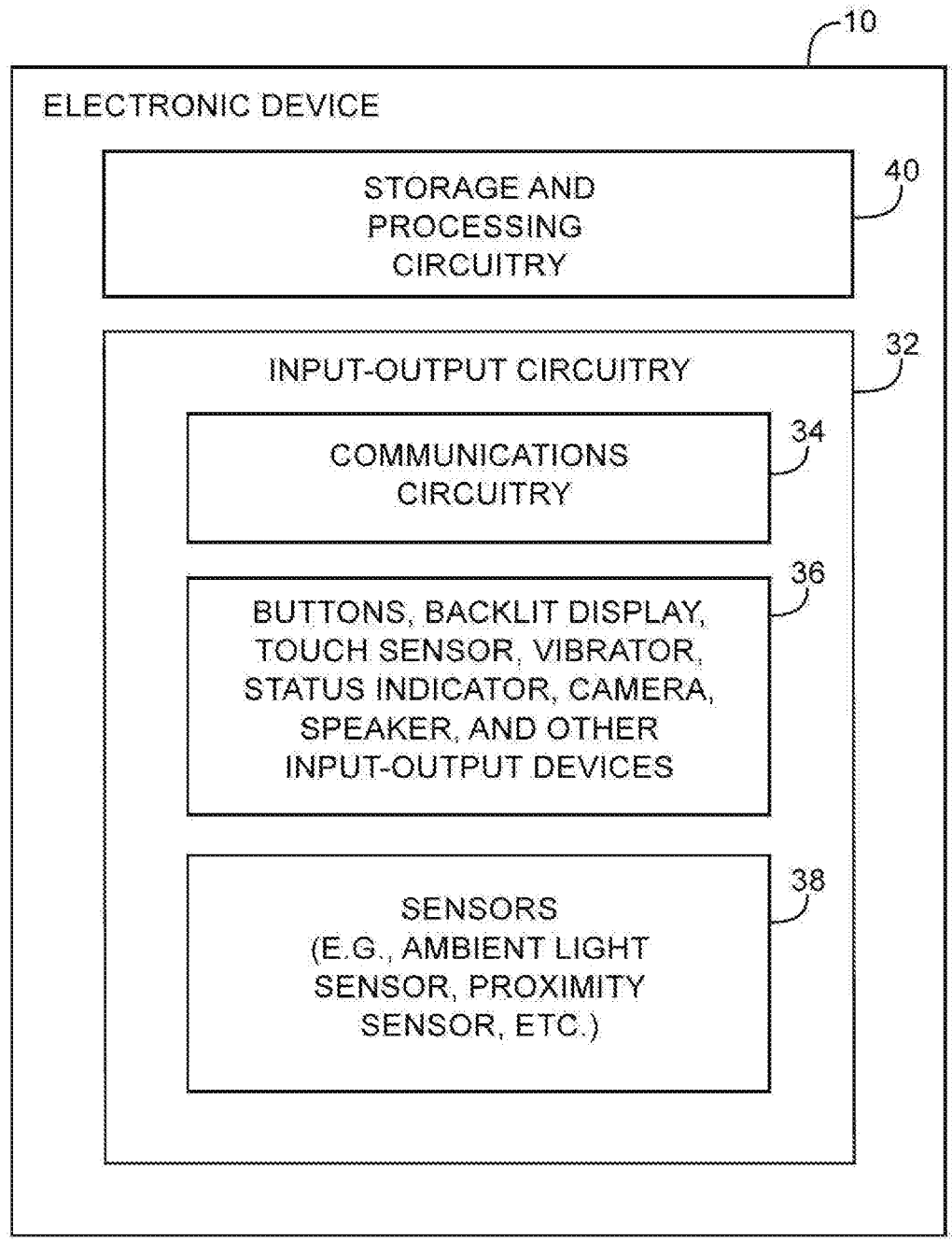
FIG. 2 is a schematic diagram of an illustrative electronic device with a proximity sensor in accordance with an embodiment of the present invention.

A schematic diagram of device 10 showing how device 10 may include sensors and other components is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10, such as internet browsing applications, email applications, media playback applications, operating system functions, software for capturing and processing images, software implementing functions associated with gathering and processing sensor data, software that makes adjustments to display brightness and touch sensor functionality, etc.

Input-output circuitry 32 may be used to allow data to be supplied to device 10 and to allow data to be provided from device 10 to external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as button 16 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include an ambient light sensor for gathering information on ambient light levels such as ambient light sensor 24. Ambient light sensor 24 may include one or more semiconductor detectors (e.g., silicon-based detectors) or other light detection circuitry. Sensors 33 may also include proximity sensor components. Sensors 38 may, for example, include a dedicated proximity sensor such as proximity sensor 26 and/or a proximity sensor formed from touch sensors 20 (e.g., a portion of the capacitive touch sensor electrodes in a touch sensor array for display 14 that are otherwise used in gathering touch input for device 10 such as the sensor electrodes in region 22 of FIG. 1). Proximity sensor components in device 10 may, in general, include capacitive proximity sensor components, infrared-light-based, proximity sensor components, proximity sensor components based on acoustic signaling schemes, or other proximity sensor equipment. Sensors 38 may also include a pressure sensor, a temperature sensor, an accelerometer, a gyroscope, and other circuitry for making measurements of the environment surrounding device 10.

Sensor data such as proximity sensor data from sensors 38 may be used in controlling the operation of device 10. Device 10 can activate or inactivate display 14, may activate or inactivate touch screen functionality, may activate or inactivate a voice recognition function on device 10, or may take other suitable actions based at least partly on proximity sensor data.

Figure 3:
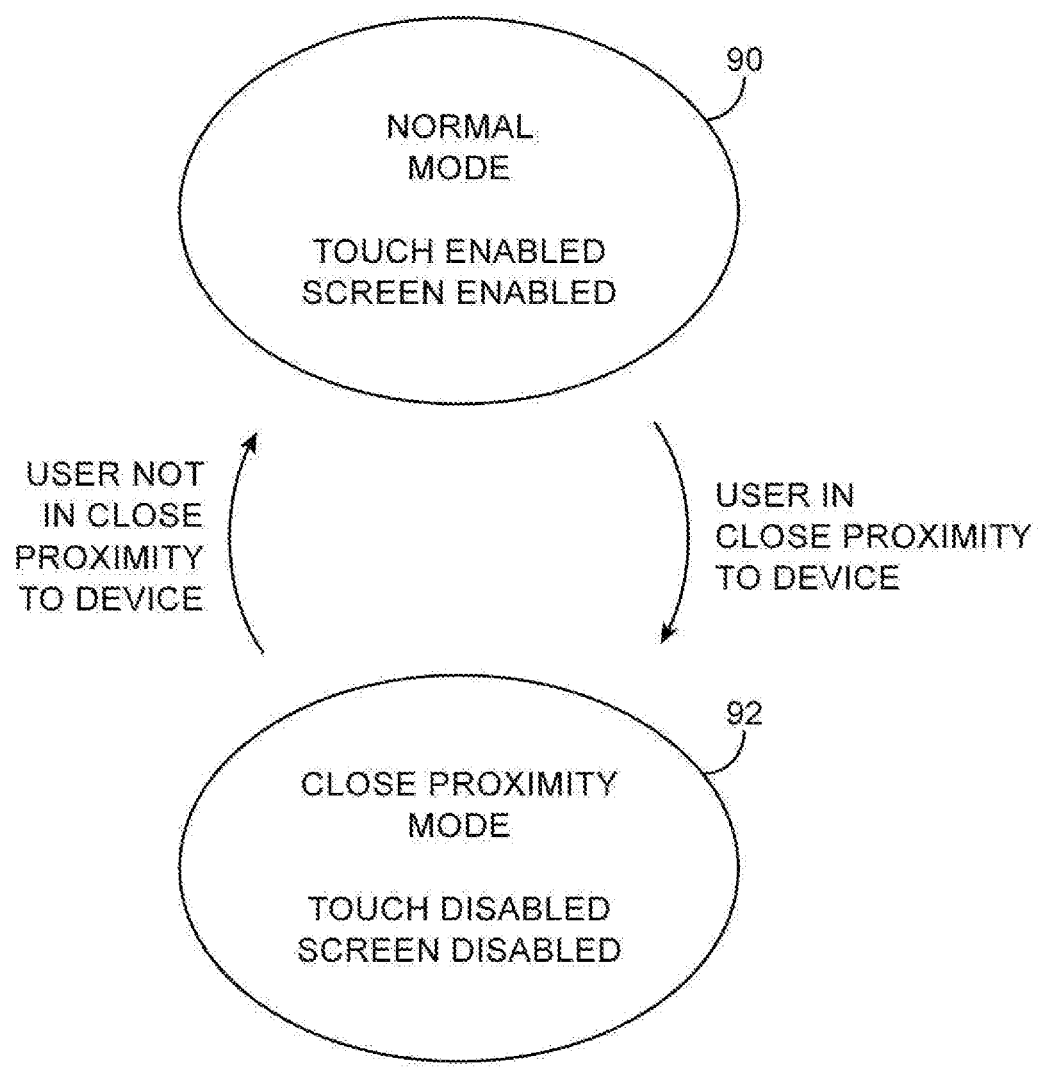
FIG. 3 is a diagram showing how an electronic device may adjust display and touch sensor functionality in response to proximity sensor measurements in accordance with an embodiment of the present invention.

FIG. 3 is a diagram illustrating how the operation of device 10 may be controlled using proximity sensor data from proximity sensor 26. In state 90, device 10 may be operated in a normal mode. For example, device 10 may be operated in a mode in which storage and processing circuitry 40 enables touch sensor operation (e.g., the operation of touch sensor electrodes 20 for touch screen display 14) and enables display 14 (e.g., by adjusting display pixels 21 so that an image is displayed for a user). During the normal mode operations of step 76, device 10 may use control circuitry 40 to gather and analyze proximity sensor data from proximity sensor 26.

When the proximity sensor data is indicative of a user in close proximity to device 10, device 10 may be operated in a close proximity mode (state 92). In state 92, device 10 can take actions that are appropriate for scenarios in which device 10 is held adjacent to the head of the user. For example, control circuitry 40 may temporarily disable touch screen functionality in display 14 and/or may disable display 14 (e.g., by turning off display pixel array 21). While operating in state 92, device 10 may use control circuitry 40 to gather and analyze proximity sensor data from proximity sensor 26 to determine whether the user is no longer in close proximity to device 10. When the proximity sensor data is indicative of the absence of a user in close proximity to device 10, device 10 may foe placed back into state 90.

The example of FIG. 3 is merely illustrative. Device 10 may, in general, take any suitable action based on proximity sensor data. For example, device 10 may activate or inactivate voice recognition capabilities for device 10, may invoke one or more software programs, may activate or inactivate operating system functions, or may otherwise control the operation of device 10 in response to proximity sensor information.

Figure 4:
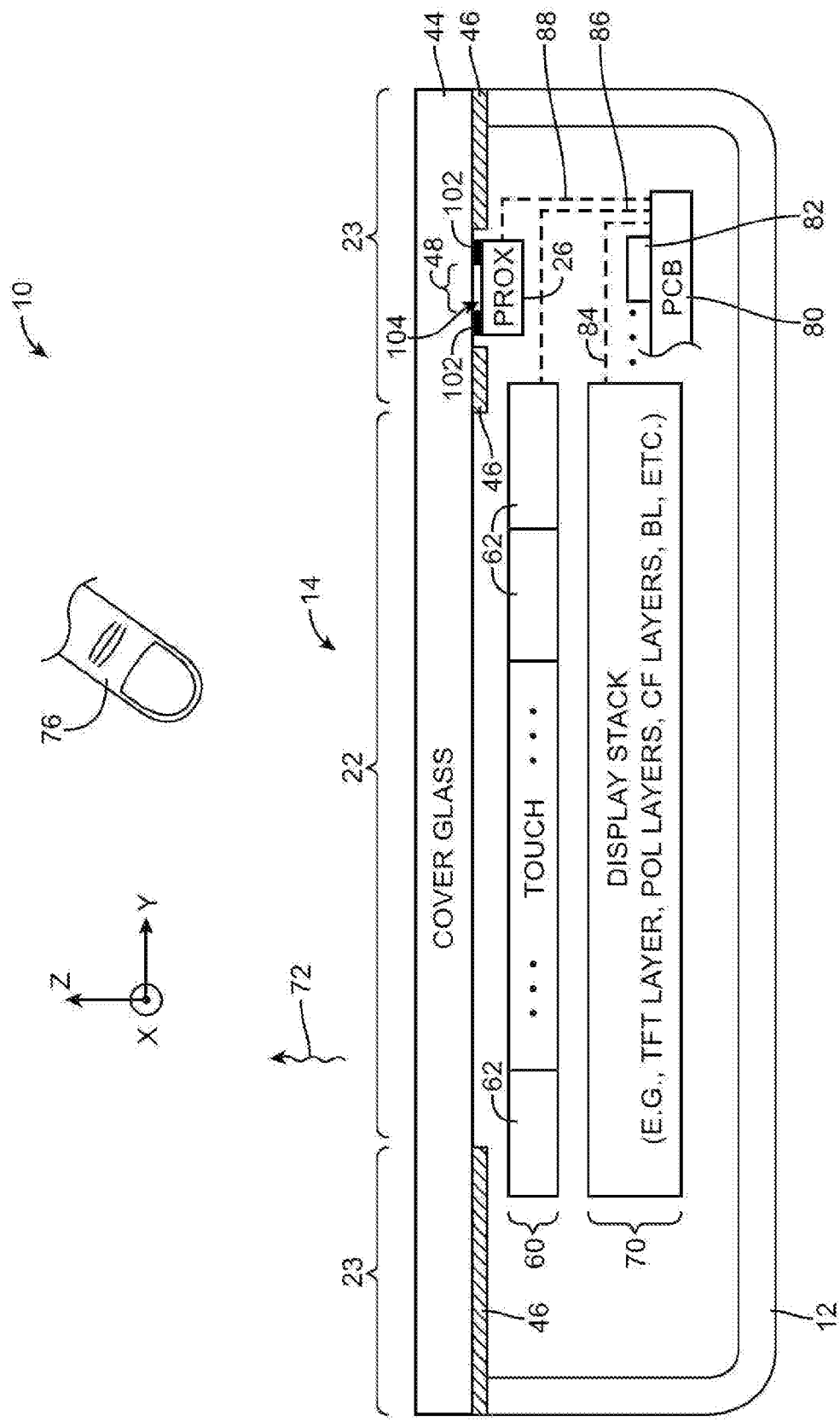
FIG. 4 is cross-sectional side view of an illustrative electronic device having a display layer and a proximity sensor in accordance with an embodiment of the present invention.

FIG. 4 is a cross-sectional side view of device 10 in FIG. 1 cut along line 94 and view in direction 96. As shown in FIG. 4, device 10 may include a display such as display 14. Display 14 may have a cover layer such as display layer 44. Display layer 44 may be formed from a layer of glass, a layer of plastic, or other transparent material. If desired, the functions of display layer 44 may be performed by other display layers (e.g., polarizer layers, anti-scratch films, color filter layers, etc.). The arrangement of FIG. 3 is merely illustrative.

Display structures that are used in forming images for display 14 may be mounted under active region 22 of display 14. Display 14 may include a display stack structure 70 having a backlight unit, light polarizing layers, color filter layers, thin-film transistor (TFT) layers, and other display structures. Display 14 may be implemented using liquid crystal display structures. If desired, display 14 may be implemented using other display technologies. The use of a liquid crystal display is merely illustrative.

The display structures of display 14 may include a touch sensor array such as touch sensor array 60 for providing display 14 with the ability to sense input, from an external object such as external object 76 when external object 76 is in the vicinity of a touch sensor on array 60. With one suitable arrangement, touch sensor array 60 may be implemented on a clear dielectric substrate such as a layer of glass or plastic and may include an array of indium tin oxide electrodes or other clear electrodes such as electrodes 62. The electrodes may be used in making capacitive touch sensor measurements.

An opaque masking layer such as opaque masking layer 46 may be provided in inactive region 26. The opaque masking layer may be used to block internal device components from view by a user through peripheral edge portions of clear display cover layer (sometimes referred to as cover glass) 44. The opaque masking layer may be formed from black ink, black plastic, plastic or ink of other colors, metal, or other opaque substances. Windows such as proximity sensor window 48 may be formed in opaque masking layer 46. For example, circular holes or openings with other shapes may be formed in layer 46 to serve as proximity sensor window 48.

At least one proximity sensor 26 may be provided in device 10. As shown in FIG. 4, proximity sensor 26 may be mounted within device 10 by mounting proximity sensor 26 directly to the inner surface of cover glass 44 at proximity sensor window 48 via pressure sensitive adhesive 102 or other adhesive materials. Space 104 between proximity sensor 26 and cover glass 44 may be filled with air, glass, plastic, or other transparent material so that light may pass through window 48 during optical proximity sensing operations. If desired, proximity sensor 26 may be mounted, to opaque masking layer 46, on other layers of display 14, printed circuit boards, housing structures, or other suitable mounting structures within housing 12 of device 10.

Display, touch, and sensor circuitry in device 10 may be coupled to circuitry on a substrate such as printed circuit board (PCB) 80. The circuitry on substrate 80 may include integrated circuits and other components (e.g., storage and processing circuitry 30 of FIG. 2). For example, circuitry in display stack 70 may be coupled to circuitry on substrate 80 via path 84, circuitry in touch sensor array 60 may be coupled to circuitry on substrate 80 via path 86, and proximity sensor 26 may be coupled to circuitry on substrate 80 via path 88. Paths 84, 86, and 88 may be formed using flexible printed circuit ("flex circuit") cables, indium tin oxide traces or other conductive patterned traces formed on a dielectric substrate, and/or other conductive signal path structures. These signal path structures (e.g., paths 84, 86, and 88) may have terminals that are coupled to the various circuitries within device 10 via one or more contacts such as gold pads or pads formed from other metals, metal traces using anisotropic conductive film (ACF) or other conductive adhesive, solder connections, welds, connections formed using connectors, and other types of electrical interconnect techniques.

During operation of device 10, light signals may pass through proximity sensor window 48 for use in detecting the proximity of a user body part. Signals from proximity sensor 26 may be routed to analog-to-digital converter circuitry that is implemented within the silicon substrates from which proximity sensor 26 is formed, to analog-to-digital converter circuitry that is formed in an integrated circuit that is mounted to display stack 70, or to analog-to-digital converter circuitry and/or other control circuitry located elsewhere in device 10 such as one or more integrated circuits in storage and processing circuitry 30 of FIG. 2 (e.g., integrated circuits containing analog-to-digital converter circuitry for digitizing analog proximity sensor signals from sensor 26 such as integrated circuits 82 on substrate 80).

If desired, a proximity sensor may be implemented as part of a silicon device that has additional circuitry (i.e., proximity sensor 26 may be implemented as integrated circuits). A proximity sensor with this type of configuration may be provided with built-in analog-to-digital converter circuitry and communications circuitry so that digital sensor signals can be routed to a processor using a serial interface or other digital communications path.

Conventional proximity sensors utilize infrared light emission and infrared light detection to sense the proximity of a user's hair, ear, or other body part. During operation of device 10, smudges from finger grease, facial oil, rain drops, or other contaminants may be deposited on the display cover glass layer and can potentially affect proximity sensor readings. When a smudge is present over proximity sensor 26, more infrared light will be reflected into light detector 30 than expected (as an example).

During operation, care must be taken to avoid false positives (e.g., situations in which the reflection of light from a smudge makes it erroneously appear as though device 10 is in the vicinity of the user's head when it is not). In accordance with an embodiment of the present invention, a proximity sensor may be provided with smudge sensing capabilities to improve proximity sensor performance in such types of challenging operating scenarios.

Figure 5:
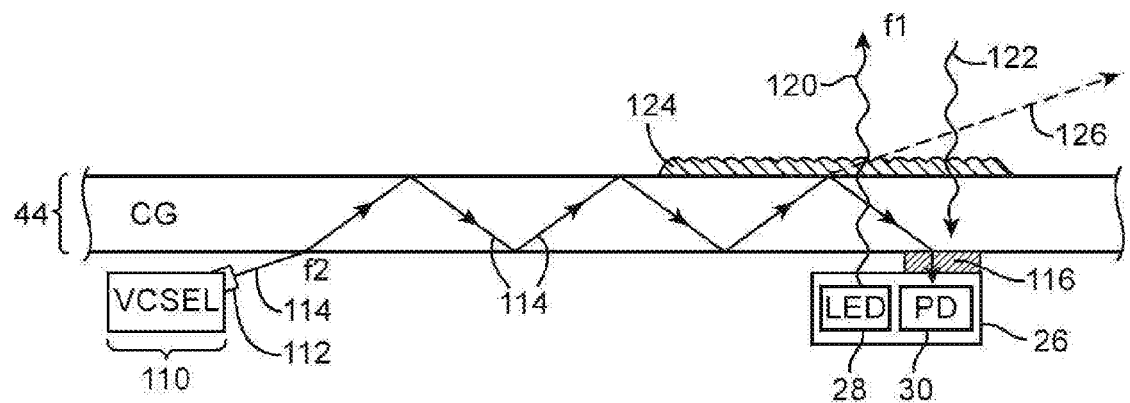
FIG. 5 is a cross-sectional side view of proximity sensor circuitry configured to detect for the presence of a first type of smudge in accordance with an embodiment of the present invention.

FIG. 5 is a cross-sectional side view of device 10 cut along line 98 (see, FIG. 1). As shown in FIG. 5, proximity sensor 26 may include an emitter element (or light source) such as a light-emitting diode (LED) 28 and a detector element such as a photodiode (PD) 30. Light-emitting diode 28 and photodiode 30 may, for example, be formed on the same integrated circuit, or on separate integrated circuits within one integrated circuit package. Optical isolation material (e.g., metal, infrared light filter structures, or other materials that are opaque to IE light) may be interposed between emitter 28 and detector 30 so as to prevent light emitted from LED 28 from directly being received by photodiode 30.

During operation, light-emitting diode 28 may serve as a light source for emitting infrared light outwards from the front face of device 10 (as indicated by light signal 120). When device 10 is not in the vicinity of a user's head, the infrared light will not be reflected towards sensor 30 and only small amounts of reflected light will be detected by sensor 30. When, however, device 10 is adjacent to the user's head, the light emit from infrared LED 28 will be reflected from the user's head and detected by sensor 30 (as indicated by light signal 122).

In the exemplary scenario as illustrated in FIG. 5, a film of smudge 124 (e.g., finger grease, facial oil, water, or other viscous contaminants that may or may not be capable of trapping bubbles) may be temporarily deposited on display layer 44 above proximity sensor 26. When smudge 124 is present over proximity sensor 26, more infrared light will be reflected into light detector 30 than expected (e.g., a portion of light 120 emitted from LED 28 may foe inadvertently reflected back towards photodiode 30 in the presence of smudge 124) and may potentially result in a false positive reading.

In an effort to reduce the occurrence of such types of false positives, device 10 may be provided with an additional emitter element 110 that serves as a second light source for use in the detection of smudge 124. Emitter 110 may, for example, be a vertical-cavity surface-emitting laser (VCSEL) or other types of light-emitting diode capable of producing a controlled beam of infrared light via lens 112. Emitter 110 may be used to inject infrared light signal (or light ray) 114 into display layer 44. Light signal 114 should be injected into display layer 44 at an angle such as light signal 114 experiences total internal reflection within display layer 44 (e.g., so that light signals 114 are guided within display layer 44 by total internal reflection).

The distance between light source 110 and photodiode 30 and the angle at which light signal 114 is injected into display layer 44 may be chosen such that light signal 114 will be received by photodiode 30 when no smudge is present over proximity sensor 26. As shown in FIG. 5, light collimating material 116 may be formed at the inner surface of display layer 44 so that light signal 114 striking directly above photodiode 30 will be diffracted or directed towards photodiode 30. Display layer 44 may be formed using a material having a first refractive index, whereas collimating structure 116 may be formed using a material having a second refractive index that is generally higher than the first refractive index.

When smudge 124 is deposited on display layer 44 over proximity sensor 26, however, light signal 114 striking the outer surface of display layer 44 on which smudge 124 is currently present may cause light signal 114 to be refracted. As a result, light signal 114 may escape from the outer surface of display layer 44 as indicated by path 126. In other words, if smudge 124 is not present, light signal 114 will be internally reflected towards photodiode 30 so that photodiode 30 senses a baseline amount of light from emitter 110. If smudge 124 is present, at least a portion of light signal 114 will escape so that, photodiode 30 senses a reduced amount of light from emitter 110 that is less than the baseline amount. The presence of smudge 124 can therefore be determined by monitoring the amount of light 114 that is received by photodiode 30 from emitter 110.

Emitter 28 and emitter 110 may both be used to generate infrared light signals. In particular, light 120 generated by LED 28 may sometimes be referred to as proximity sensing light signals, whereas light 114 generated by VCSEL may sometimes be referred to as smudge detection light signals. In order to be able to differentiate between the two types of light signals, the proximity sensing light signals may be generated at a frequency f1 while the smudge detection light signals may be generated at a frequency f2 that is different than f1. As an example, frequency f1 at which proximity sensing light signals 120 are generated by be less than frequency f2 at which smudge detection light signals 114 are generated. As another example, frequency f1 at which proximity sensing light signals 120 are generated may be greater than frequency f2 at which smudge detection light signals 114 are generated.

In another suitable arrangement, emitter 110' may be used, to inject infrared light signal 130 into display layer 44. Light signal 130 should be injected into display layer 44 at an angle such as light signal 130 experiences total internal reflection within display layer 44.

The distance between emitter 110' and photodiode 30 and the angle at which light ray 130 is injected into display layer 44 may be chosen such that photodiode 30 will not receive light 130 when smudge is absent from the surface of display layer 44. Photodiode 30 should only receive light from emitter 110' when a layer of smudge 132 (e.g., water) is present over proximity sensor 26. When smudge 132 is deposited on display layer 44 over proximity sensor 26, light signal 130 striking the outer surface of display layer 44 on which smudge 130 is currently present may cause light signal 130 to be dispersed. As a result, light signal 130 may be dispersed internally within display layer 44 as indicated by path 134 so that a portion of light 130 will be received by photodiode 30.

In other words, if smudge 132 is not present, light ray 130 will be internally reflected and no light will be received by photodiode 30 from emitter 110'. If smudge 132 is present, at least a portion of light ray 130 will be directed towards photodiode 30 so that photodiode 30 senses some amount, of light from emitter 110'. The presence of smudge 132 can therefore be determined by monitoring the amount of light 130 that is received by photodiode 30 from emitter 110'. As in the arrangement of the type described in connection with FIG. 5, the proximity sensing light signals generated by LED 26 and the smudge detection light signals 130 generated by VCSEL 110' may be generated using different respective frequencies so as to be able to differentiate between the two different types of light.

If desired, proximity sensor 26 may foe provided with both auxiliary smudge sensing emitters 110 and 110' for detecting smudges of different types (e.g., for detecting a first type of smudge that causes normally internally reflecting light rays to escape from display layer 44, for detecting a second type of smudge, that, causes light rays to diffract internally within display layer 44, and for detecting other types of smudge with other optical characteristics). Different light intensities may be produced by emitter 110 and 110' so that the amount of light sensed by photodiode 30 can be used to deterministically identify whether smudge is present over proximity sensor 26. Moreover, emitters 110 and 110' may be configured to produce signals at different respective frequencies so as to further help differentiate between data gathered from the two types of smudge sensing mechanisms. The examples of FIGS. 5 and 6 in which the light output from emitter 110 and 110' experiences multiple internal reflections or "bounces" are merely illustrative. If desired, the light output from emitter 110 and 110' may be configured to only experience a single bounce (e.g., so that the light hits the top surface of display layer 44 and then reflects back towards photodiode 30).

Figure 7:
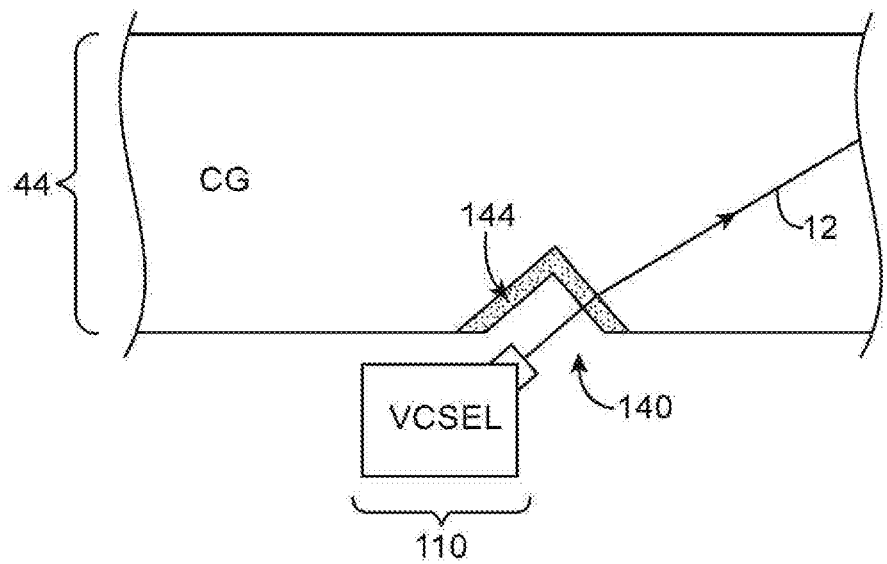
FIG. 7 is a diagram showing how a display layer notch can be formed to facilitate the launching of smudge sensing light signals in accordance with an embodiment of the present invention.

FIG. 7 is a cross-sectional view showing how a notch such as notch 140 may be formed at the inner surface of display layer 44 above emitter 110. Notch 140 may serve to facilitate the injection or "launching" of light signal 142 that is generated by VCSEL 110 (or VCSEL 110') into display layer 44. If desired, an IR ink layer 144 (e.g., a layer that, prevents passage of visible light) may be formed to line notch 140 so that a user cannot see light being generated from emitter 110. The shape of notch 140 may be chosen based on the manufacturability of notch 140 in display layer 44 (e.g., depending on whether the cover layer is formed from glass, plastic, etc.)

and/or based on optical simulation so that light 142 can be properly launched from emitter 110 into display layer 44.

Figure 8:
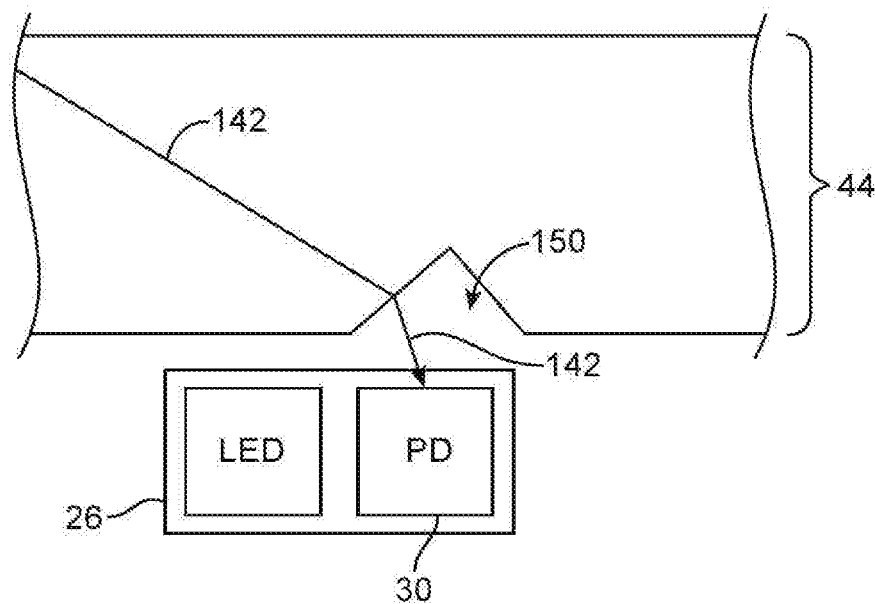
FIG. 8 is a diagram showing how a display layer notch can be formed to facilitate the departure of smudge sensing light signals in accordance with an embodiment of the present invention.

FIG. 8 is a cross-sectional view showing how a notch such as notch 150 may be formed at the inner surface of display layer 44 above photodiode 30. Notch 150 may serve to facilitate the departure of light signal 142 into photodiode 30. This feature may be used in conjunction with the arrangement described in connection with FIG. 5 so that light rays generated by emitter 110 can exit display layer 44 at desired angles. The shape of notch 150 may be chosen based on the manufacturability of notch 150 in display layer 44 and/or based on optical simulation so that light 142 arriving at notch 150 will be properly directed, towards photodiode 30.

Figures 9, 10:
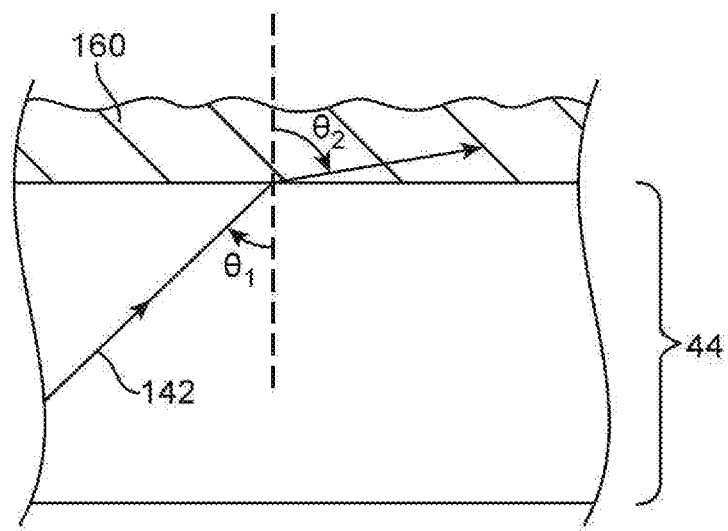
FIG. 9 is a cross-sectional side view of the interface between a display layer and smudges in accordance with an embodiment of the present invention.
FIG. 10 is a table showing smudge sensing light rays having different respective angles of incidence that can be used for detecting the presence of water and oil in accordance with an embodiment of the present invention.

In order for light rays generated by the smudge sensing light source to experience total internal reflection, the light rays should be injected so that the light rays strike the outer and inner surfaces of display layer 44 at desired angles of incidence. FIG. 9 is a cross-sectional view showing light signal 142 travelling through display layer 44. As shown in FIG. 9, light signal 142 may strike the outer surface of display layer 44 at an angle of incidence $\theta_1$. In order for light 142 to be internally reflected within display layer 44, the corresponding refracted/reflected ray should have an angle of refraction $\theta_2$ of more than 90° (or alternatively, an angle of reflection of less than 90°).

The relationship between $\theta_1$ and $\theta_2$ may be governed by Snell's law according to one following equation:

$$n_1 * \sin(\theta_1) = n_2 * \sin(\theta_2) \quad (1)$$

where $n_1$ is the refractive index of display layer 44 and where $n_2$ is the refractive index of whatever medium is currently at the surface of display layer 44. In the example of FIG. 9, smudge 160 is deposited on top of display layer 44. Consider a scenario in which display layer 44 is formed from glass (which has a refractive index of 1.5) and in which smudge 160 includes water (which has a refractive index of 1.33). To calculate the critical angle of incidence for which light 142 is first totally internally reflected, $\theta_2$ is set to 90° and the resulting value of $\theta_1$ according to equation 1 will be equal to the critical angle $\theta_c$, as expressed using the following equation:

$$\theta_c = \sin^{-1}(n_2/n_1) \quad (2)$$

In the exemplary scenario in which display layer 44 is glass and smudge 160 is water, the critical angle will be equal to approximately 62.5° (i.e., by calculating the inverse sine of the ratio of 1.33 to 1.5). In other words, $\theta_1$ has to be at least greater than 62.5° for light signal 142 to be totally internally reflected within display layer 44.

Consider another scenario in which smudge 160 contains grease and/or oil (which has a refractive index of 1.515). In this scenario, there is no solution for the critical angle since the sine function cannot produce a value that is greater than one (i.e., 1.515 divided by 1.5 is greater than one). In other words, if oil/grease is deposited on the surface of display cover glass 44, light 142 will escape from the surface of display layer 44 regardless of the angle of incidence.

Consider another scenario in which smudge is absent from the surface of display layer 44 (e.g., only air exists at the surface of display layer 44). Air may, for example, nave an index of refraction that is equal to 1.0. In this scenario in which display layer 44 is formed from glass and only air is at the surface of display layer 44, the critical angle will be equal to approximately 41.8° (i.e., by calculating the inverse sine of the ratio of 1.0 to 1.5). In other words, $\theta_1$ has to be at least greater than 41.8° for light signal 142 to be totally internally reflected within display layer 44 when no smudge is present.

Figure 6:
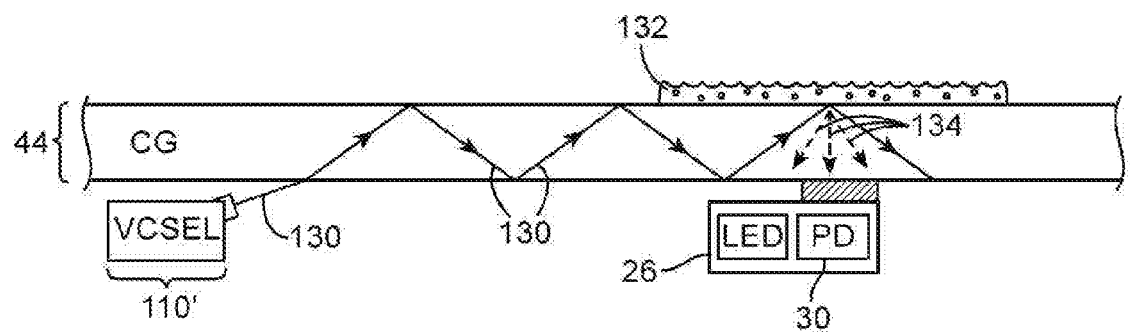
FIG. 6 is a cross-sectional side view of proximity sensor circuitry configured to detect for the presence of a second type of smudge in accordance with an embodiment of the present invention.

Critical angle information associated with different types of smudges determined in this way can be used to determine the angle at which light signals are injected into display layer 44 using emitter 110/110'. In the example of FIG. 5 in which a film of oil 124 is deposited over proximity sensor 26, emitter 110 may generate light ray 114 in a way such that light ray 114 strikes the surfaces of display layer 44 at an angle of incidence that is between 62.5° and 90° (see, e.g., FIG. 10). In the example of FIG. 6 in which a layer of water 132 is deposited over proximity sensor 26, emitter 110' may generate light ray 130 in a way such that light ray 130 strikes the surfaces of display layer 44 at an angle of incidence that is between 42° and 62.5°. The values shown in FIG. 10 are merely illustrative and do not serve to limit the scope of the present invention. If desired, any number of smudge sensing light sources may be used to generate different light rays that strike the surfaces of display layer 44 at desired angles of incidence for detecting any type of smudge over proximity sensor 26.

Figure 11:
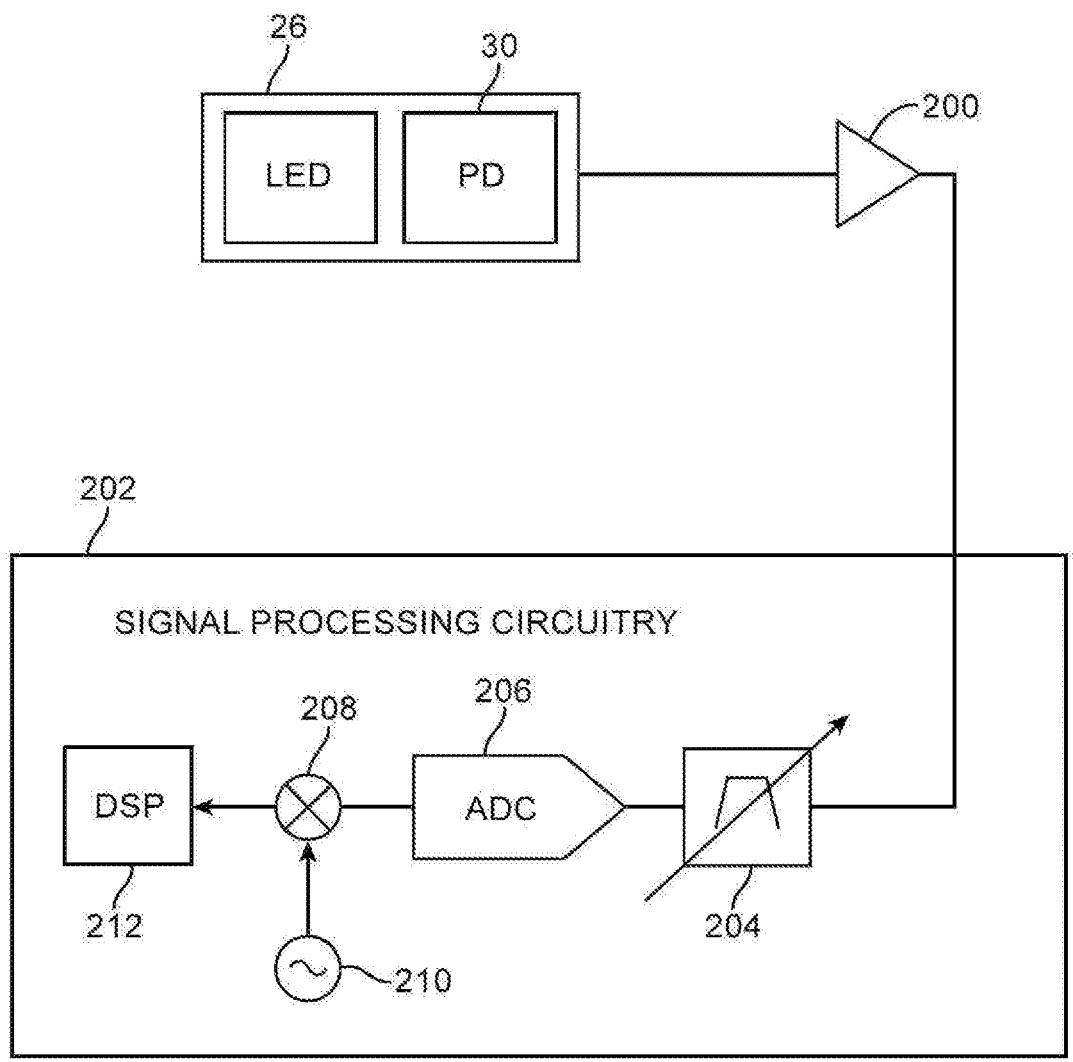
FIG. 11 is a circuit diagram of a proximity sensor and associated signal processing circuitry in accordance with an embodiment of the present invention.

FIG. 11 is a circuit diagram of proximity sensor 26 and associated signal processing circuitry 202. As shown in FIG. 11, proximity sensor 26 may be coupled to associated signal processing circuitry 204 that is used for analyzing data that is gathered using proximity sensor 26.

Signal processing circuitry 204 may have an input operable to receive proximity sensor output signals from photodiode 30 via an operational amplifier circuit 200. Operational amplifier circuit 200 may be used to amplify signals that have been detected by photodiode 30. Amplifier 200 may sometimes be considered to be part of circuitry 204.

Signal processing circuitry 204 may include a filter such as adjustable band-pass filter circuit 204, a data converting circuit such as analog-to-digital converter (ADC) 206, a mixer circuit 208, a periodic control signal generation circuit such as oscillator 210 (e.g., an on-chip or off-chip clock generation circuit), and a digital signal processor (DSP) 212. Signal generation circuit 210 may be configured to generate, for example, a square-wave clock signal, a sine-wave control signal, a cosine-wave control signal, or other types of periodic control signal.

Photodiode 30 may generate an integrated sensor output signal that includes both proximity sensing data (e.g., data indicative of the amount of light that has been reflected back in response to emitting light from first light source 28) and smudge sensing data (e.g., data indicative of the amount of light that has been refracted/diffracted while being guided within display layer 44 in response to injecting light into display layer 44 using light source 110/110'). The integrated sensor output signal may be amplified using circuit 200 and fed to filter circuit 204. Filter circuit 204 may be placed in different states to only pass signals at desired frequencies.

Figure 12:
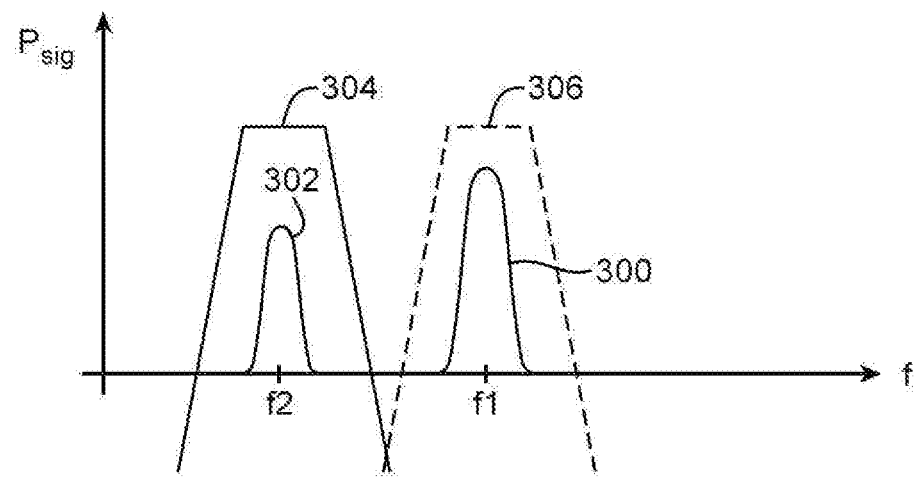
FIGS. 12 and 13 are diagrams showing illustrative filtering operations that can be performed when processing proximity sensor output signals in accordance with an embodiment of the present, invention.

During a first detection mode (e.g., a first analysis mode during which the smudge sensing data is being extracted from the integrated sensor output signal), filter 204 may provide band-pass filtering at frequency f2 to only pass through smudge sensing signal component 302 (see, e.g., filtering characteristic 304 in FIG. 12). The filtered signal may then be fed to ADC 206 to convert the analog smudge sensor data to its digital equivalence (e.g., converter 206 may be used to generate a digitized version of the filtered smudge signal component). Mixer 208 may then be used to demodulate the digital version of the smudge signal component. The demodulated signal may then be fed to DSP 212 for further processing.

During a second detection mode (e.g., a second analysis mode during which the proximity sensing data is being extracted from the integrated sensor output signal), filter 204 may provide band-pass filtering at frequency f1 to only pass through proximity sensing signal component 300 (see, e.g., filtering characteristic 306 in FIG. 12). The filtered signal may then be fed to ADC 206 to convert the analog proximity sensor data to its digital equivalence. Mixer 208 may then be used to demodulate the digital version of the proximity signal component. The demodulated signal may then be fed to DSP 212 for further processing.

Figure 13:
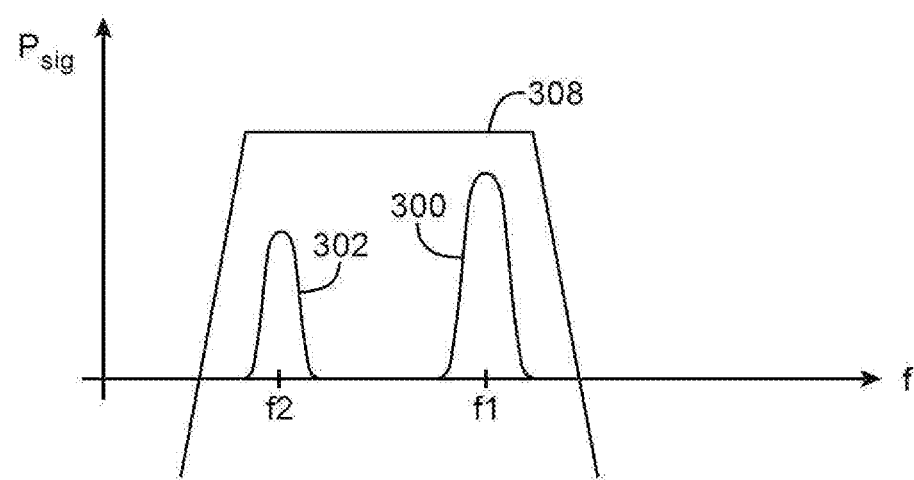

The example of described in connection with FIG. 12 in which band-pass filter 204 performs selective filtering on analog signals is merely illustrative. In other suitable arrangements, filter 204 may be configured to provide analog filtering that passes through both proximity and smudge sensing components 300 and 302 (see, e.g., filtering characteristic 308 in FIG. 13). In the scenario in which filter 204 passes through both signal components, the signal components may be split in the digital domain using DSP 212 by performing fast Fourier transform (FFT) operations (as an example).

Proximity sensing data and smudge sensing data gathered in this way may be used to accurately determine whether a user is in close proximity to device 10 (e.g., to determined whether an external object is within 5 cm or less of sensor 26, within 1 cm or less of sensor 26, or within other suitable distance of sensor 26). If the proximity sensor data (e.g., the signal component at a first frequency f1 that is proportional to the amount of light reflecting back from an external object) is greater than a predetermined light threshold, a corresponding high first sensor reading may be obtained. The smudge sensor data (e.g., the signal component at a second frequency f2 that is proportional to the amount of light received by photodiode 30 from light source 110/110') may be used to determine whether smudges are present on display layer 44 over proximity sensor 26. If smudge is present, a corresponding high second sensor reading may be obtained. If smudge is not present, a corresponding low second sensor reading may be obtained.

Consider a scenario in which the first sensor reading is low. In this scenario, processor 212 correctly identifies that no user is in close proximity and places device 10 in the normal operating mode (see, FIG. 3). Consider another scenario in which the first sensor reading is high and the second sensor reading is low. In this scenario, processor 212 correctly identifies that because no smudge is present, the high proximity sensor data is indicative of a user who is in the vicinity of device 10, and device 10 is placed in the close proximity mode.

Consider yet another scenario in which the first and second sensor readings are both high. In this scenario, processor 212 is able to identify that the high proximity sensor data is due to the presence of smudge and should therefore be ignored (e.g., device 10 should be placed in normal operating mode), thereby correctly preventing a false positive proximity determination. Providing device 10 with smudge detection capabilities can therefore be useful in prevent erroneous readings caused, by the presence of smudge or other contaminants that can potentially be deposited over display layer 44.

Figure 14:
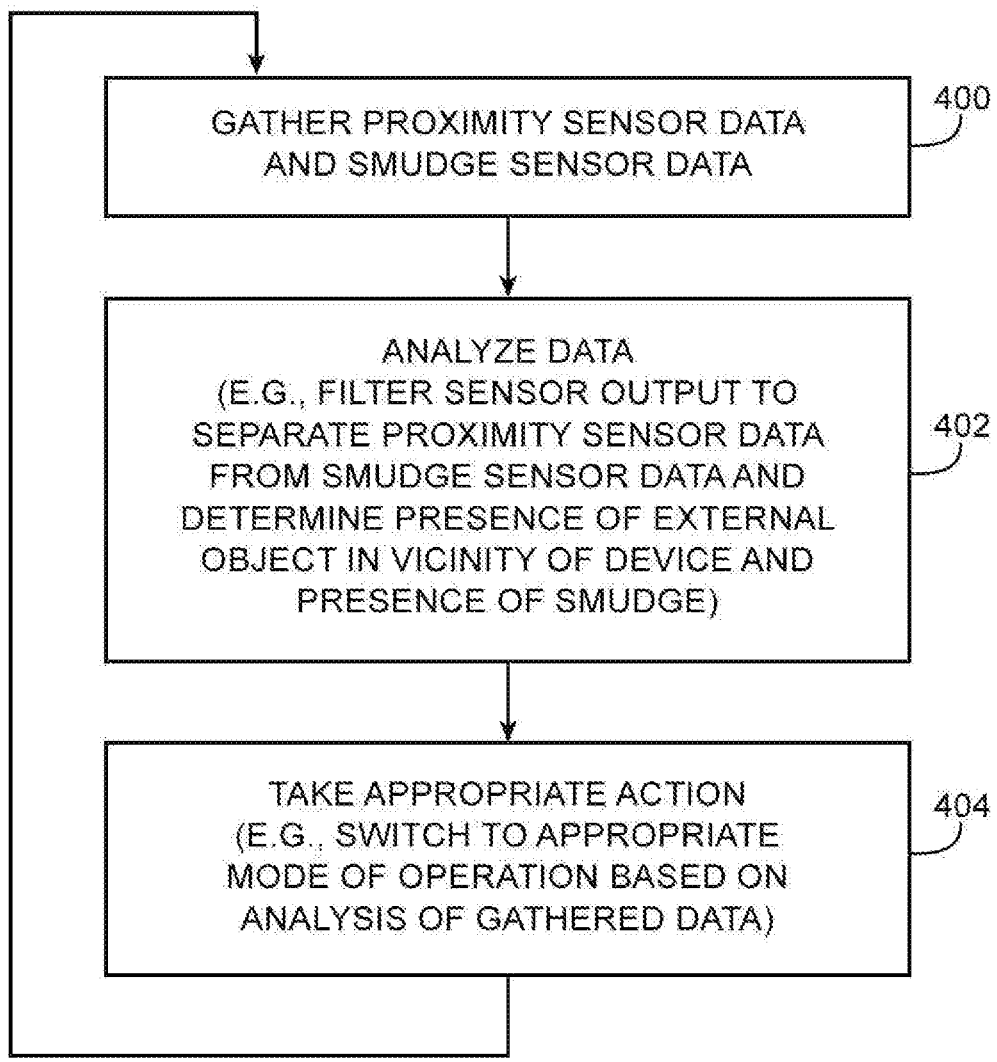
FIG. 14 is a flow chart of illustrative steps involved in operating a proximity sensor having smudge detection capabilities in accordance with an embodiment of the present invention.

FIG. 14 is a flow chart of illustrative steps involved in gathering and using proximity sensor data in the operation of device 10. As shown in FIG. 10, electronic device 10 may gather proximity sensor data during the operations of step 400. During step 400, storage and processing circuitry 40 may, for example, use proximity sensor 26 of the type described in connection with FIGS. 5-8 to make optical proximity sensing measurements using light emitter 28 and detector 30 and to make smudge sensing measurements using light emitter 110/110' and detector 30. Measurement data may be stored in storage in circuitry 40 (e.g., in a buffer having storage bins).

At step 402, gathered proximity sensor data may be analyzed by device 10. Storage and processing circuitry 40 may compare proximity sensor data that has been gathered to one or more threshold values. For example, the proximity sensing data may be compared to a predetermined light threshold level, whereas the smudge sensing data may be compared to baseline light levels to determine whether smudge is present. These comparisons may be used to determine whether smudge is currently deposited over the display cover later and whether an external object is in the vicinity of device 10.

At step 404, device 10 may take suitable action based on the results of the analysis operations of step 402. For example, device 10 may activate or deactivate a voice recognition feature in device 10 or other device functionality. As another example, device 10 may use storage and processing circuitry 40 (sometimes referred to as control circuitry) to control input-output circuitry 32 such as touch sensor and/or display components based on information on whether proximity sensor readings exceeded or did not exceed proximity sensor thresholds. Time constraints (e.g., information on the time period, over which threshold values were exceeded or not exceeded), time-based filtering, and other signal processing techniques may be used in analyzing proximity sensor data during the operations of step 402.

Actions that may be taken at step 404 in response to the data analysis operations of step 402 may include enabling components, disabling components, adjusting the power supplied to components, or otherwise adjusting the operating parameters of input-output circuitry 32 of device 10. With one illustrative arrangement, which is sometimes described, herein as an example, touch screen functionality and display output functionality may be selectively enabled and disabled based on proximity sensor information from sensor 26.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
  a display layer having a surface;
  a proximity sensor mounted under the display layer, wherein the proximity sensor has a first light source that is configured to emit a first light signal and a light detector configured to receive reflections of the first light signal; and
  a second light source that is configured to emit a second light signal that travels within the display layer by total internal reflection, wherein the light detector is configured to measure the second light signal to monitor smudges on the surface of the display layer.

2. The electronic device defined in claim 1, further comprising:
  a touch screen display that is controlled based on measurements gathered using the light detector.

3. The electronic device defined in claim 1, wherein the second light source comprises a laser-based light-emitting diode.

4. The electronic device defined in claim 1, further comprising:
  light collimating material interposed between the display layer and the proximity sensor, wherein the light collimating material is configured to guide the second light signal into the light detector, and wherein the light collimating material has a refractive index that is greater than that of the display layer.

5. The electronic device defined in claim 1, wherein the display layer includes a notch configured to receive the second light signal from the second light source.

6. The electronic device defined in claim 5, further comprising:
material formed in the notch, wherein the material prevents passage of visible light.

7. The electronic device defined in claim 1, wherein the display layer includes a notch positioned over the light detector, and wherein the second light signal exits the display layer into the light detector via the notch.

8. The electronic device defined in claim 1, further comprising:
signal processing circuitry configured to receive a sensor output signal from the proximity sensor, wherein the associated signal processing circuitry includes an adjustable filter circuit for performing selective band-pass filtering operations on the sensor output signal.

9. A method of operating an electronic device having a display layer, a proximity sensor mounted under the display layer, and a light source, the method comprising:
gathering proximity sensor data by emitting first light signals and detecting corresponding reflected light signals with the proximity sensor, wherein the first light signals exit the display layer and are reflected off of an external object to generate the corresponding reflected light signals; and
emitting second light signals into the display layer using the light source, wherein the second light signals are guided within the display layer by total internal reflection within the display layer.

10. The method defined in claim 9, wherein the display layer has a surface, the method further comprising:
detecting smudges on the surface of the display layer by measuring the second light signals guided within the display layer.

11. The method defined in claim 10, wherein measuring the second light signals comprises measuring the second light signals guided within the display layer with a light detector in the proximity sensor.

12. The method defined in claim 9, wherein the electronic device further includes a touch screen display and control circuitry, the method further comprising:
with the control circuitry, controlling the touch screen display based on measurements gathered using the proximity sensor.

13. The method defined in claim 9, wherein emitting the first light signals comprises emitting the first light signals having a first frequency, and wherein emitting the second light signals comprises emitting the second light signals having a second frequency that is different than the first frequency.

14. The method defined in claim 9, wherein the display layer has a surface, the method further comprising:
detecting smudges on the surface of the display layer by monitoring for the absence of the second light signals when smudge is present on the surface of the display layer above the proximity sensor.

15. The method defined in claim 9, wherein the display layer has a surface, the method further comprising:
detecting smudges on the surface of the display layer by monitoring for the presence of the second light signals when smudge is present on the surface of the display layer above the proximity sensor.

16. The method defined in claim 13, wherein the electronic device further includes signal processing circuitry, the method further comprising:
with the proximity sensor, generating an output signal;
during a first time period, filtering the output signal by applying band-pass filtering at the first frequency using the signal processing circuitry; and
during a second time period, filtering the output signal by applying band-pass filtering at the second frequency using the signal processing circuitry.

17. The method defined in claim 13, wherein the electronic device further includes signal processing circuitry, the method further comprising:
with the proximity sensor, generating an output signal;
converting the output signal to digital signals with the signal processing circuitry; and
performing fast Fourier transform operations on the digital signals.

18. A method for operating an electronic device having a display layer, a proximity sensor mounted under the display layer, and a light source, the method comprising:
gathering proximity sensor data by emitting first light signals and detecting corresponding reflected first light signals with the proximity sensor;
gathering additional data by emitting second light signals with the light source and detecting corresponding reflected second light signals with the proximity sensor; and
determining whether an external object is in the vicinity of the electronic device based on the gathered proximity sensor data and the additional data.

19. The method defined in claim 18, wherein emitting the second light signals comprises injecting the second light signals into the display layer so that the second light signals are guided within the display layer by total internal reflection.

20. The method defined in claim 19, wherein emitting the first light signals comprises emitting the first light signals having a first frequency with an additional light source in the proximity sensor, and wherein emitting the second light signals comprises emitting the second light signals having a second frequency that is different than the first frequency with the light source.

21. The method defined in claim 18, wherein the electronic device further includes another light source and wherein the display layer has a surface, the method further comprising:
emitting third light signals with the another light source and detecting corresponding reflected third light signals with the proximity sensor, wherein the second and third light signals are guided within the display layer by total internal reflection, wherein the second light signals strike the surface of the display layer at a first angle of incidence, and wherein the third light signals strike the surface of the display layer at a second angle of incidence that is different than the first angle of incidence.

22. The electronic device defined in claim 1, wherein the light detector is a photodiode.

23. The electronic device defined in claim 1, wherein the first light signal is configured to exit the display layer through the surface and be reflected off of an external object, and wherein the reflections of the first light signal are configured to be transmitted through the surface of the display layer to the light detector.

24. The method defined in claim 9, wherein the first light signals are detected with the proximity sensor without being totally internally reflected within the display layer.

* * * * *